United States Patent
Schafheutle et al.

(10) Patent No.: US 8,318,855 B2
(45) Date of Patent: Nov. 27, 2012

(54) OIL BASED AQUEOUS POLYURETHANE DISPERSIONS

(75) Inventors: Markus Schafheutle, Graz (AT); Anton Arzt, Neu-Tillmitsch (AT); Susanne Dellinger, Graz (AT); Hannelore Gsoell, Graz (AT); Gerlinde Petritsch, Graz (AT)

(73) Assignee: Cytec Surface Specialties Austria GmbH (AT)

( * ) Notice: Subject to any disclaimer, the term of this patent is extended or adjusted under 35 U.S.C. 154(b) by 18 days.

(21) Appl. No.: 12/298,392

(22) PCT Filed: Apr. 27, 2007

(86) PCT No.: PCT/EP2007/003761
§ 371 (c)(1), (2), (4) Date: Feb. 10, 2009

(87) PCT Pub. No.: WO2007/124934
PCT Pub. Date: Nov. 8, 2007

(65) Prior Publication Data
US 2009/0318615 A1      Dec. 24, 2009

(30) Foreign Application Priority Data

Apr. 27, 2006   (EP) .................................... 06008766

(51) Int. Cl.
  *C08L 75/14* (2006.01)
  *C08L 75/06* (2006.01)
  *C08G 18/08* (2006.01)
  *C08G 18/32* (2006.01)

(52) U.S. Cl. ............................ 524/591; 528/60; 528/61

(58) Field of Classification Search ................. 524/591; 528/60, 61
See application file for complete search history.

(56) References Cited

U.S. PATENT DOCUMENTS

| | | | |
|---|---|---|---|
| 3,124,605 A | | 3/1964 | Wagner |
| 3,358,010 A | | 12/1967 | Britain |
| 3,412,054 A | | 11/1968 | Milligan et al. |
| 3,640,924 A | | 2/1972 | Hermann et al. |
| 3,801,548 A | * | 4/1974 | Williams ..................... 528/59 |
| 3,903,126 A | | 9/1975 | Woerner et al. |
| 3,903,127 A | | 9/1975 | Wagner et al. |
| 3,976,622 A | | 8/1976 | Wagner et al. |
| 4,324,879 A | | 4/1982 | Bock et al. |
| 4,331,573 A | | 5/1982 | Zabrocki et al. |
| 5,354,807 A | * | 10/1994 | Dochniak .................... 524/591 |
| 5,710,209 A | | 1/1998 | Blum et al. |
| 5,973,099 A | * | 10/1999 | Nodelman et al. .......... 528/74.5 |
| 6,359,060 B1 | | 3/2002 | Schafheutle et al. |
| 6,559,225 B1 | | 5/2003 | Irle et al. |
| 2003/0119979 A1 | * | 6/2003 | Zander et al. ............... 524/591 |
| 2006/0089453 A1 | * | 4/2006 | Pajerski ..................... 524/589 |

FOREIGN PATENT DOCUMENTS

| | | |
|---|---|---|
| DE | 2744544 A1 | 4/1978 |
| DE | 2924442 A1 | 1/1981 |
| DE | 2928552 A1 | 1/1981 |
| DE | 19506736 A1 | 8/1996 |
| DE | 19930961 A1 | 1/2001 |
| EP | 1026186 A1 | 8/2000 |
| GB | 1575637 | 9/1980 |
| WO | WO-01/44335 A1 | 6/2001 |

* cited by examiner

*Primary Examiner* — Tae H Yoon
(74) *Attorney, Agent, or Firm* — Connolly Bove Lodge & Hutz LLP

(57) ABSTRACT

A two-pack coating composition comprising curing agents selected from the group consisting of non-blocked poly-functional isocyanates I, polyaziridines Z, and carbodiimides Y, and an aqueously dispersed polyurethane U wherein the polyurethane U comprises building blocks derived from hydroxyl group containing unsaturated fatty acids B21, a process for the production of the polyurethane U, and a method of use thereof in combination with the said curing agents in preparing coating compositions which are particularly useful for wood.

6 Claims, No Drawings

OIL BASED AQUEOUS POLYURETHANE DISPERSIONS

RELATED APPLICATIONS

This application is a national stage application (under 35 U.S.C. §371) of PCT/EP2007/003761, filed Apr. 27, 2007, which claims benefit of European application 06008766.5, filed Apr. 27, 2006.

FIELD OF THE INVENTION

This invention is directed to oil based aqueous polyurethane dispersions, a process for their production, and a method of use thereof.

BACKGROUND OF THE INVENTION

Aqueous polyurethane dispersions are widely used as binders for aqueous paints. Among these paints, one-pack systems have been known which dry physically (by evaporation of the water) or by oxydative crosslinking (air-drying polyurethanes such as those described in EP 1 026 186 A1), the formation of a film being promoted where appropriate by addition of thermally activated crosslinking agents (one-pack systems or stoving paints which may be mixed well before use, and are cured with melamine resins or blocked isocyanates at temperatures above 120° C.); and two-pack systems, where hydroxy-functional binder constituents are mixed with non-blocked polyfunctional isocyanates immediately prior to application and the crosslinking reaction sets on at room temperature (or at an elevated temperature in order to accelerate the cure). In the latter case it is also possible to emulsify the non-blocked isocyanate in the aqueous dispersion of the hydroxy-functional binder component, without any premature reaction of the two components.

The basis of common polyurethane dispersions are mostly polyols selected from the group consisting of polyether and polyester polyols. These are reacted with poly-functional isocyanates, and modified with hydrophilic components such as polyethylene glycol, or anionogenic compounds such as hydroxyacids wherein the acid group does not largely react with isocyanates.

When such aqueous polyurethane dispersions are used to provide coatings on wood, the coatings thus produced are usually inferior to those made from solvent borne systems with regard to the wood wetting properties which leads to enhancement of the immanent structure found in natural substrates such as wood.

SUMMARY OF THE INVENTION

The object of the present invention is therefore to provide aqueous polyurethane dispersions which exhibit superior wood-wetting properties, while at the same time retaining other favourable polyurethane properties in coatings prepared therefrom such as mechanical and chemical resistance.

This object is achieved by means of chemically incorporating hydroxyl group containing unsaturated fatty acids into a polyurethane which is aqueously dispersed, and which can be cured with curing agents at ambient or slightly elevated temperature.

The invention therefore relates to a two-pack coating composition comprising a curing or crosslinking agent X selected from the group consisting of polyaziridines Z, carbodiimides Y, and non-blocked polyfunctional isocyanates I, and an aqueously dispersed polyurethane U wherein the polyurethane U comprises building blocks derived from hydroxyl group containing unsaturated fatty acids B2. Incorporation of the said fatty acids is effected by reaction of its hydroxyl group with an isocyanate group of a polyfunctional isocyanate A which is used in the synthesis of the polyurethane U.

The polyurethane resin U comprises building blocks derived from the following educts, or starting compounds:
polyfunctional isocyanates A,
oils B having a hydroxyl number of from 120 mg/g to 230 mg/g, which oils B are esters of polyhydric alcohols B1 and fatty acids B2, wherein at least a mass fraction of 40% of the said fatty acids B2 has at least one hydroxyl group and, optionally, at least one olefinic unsaturation,
low molar mass polyols C having a number average molar mass $M_n$ of up to 400 g/mol,
optionally, long-chain polyols C' having a number-average molar mass in excess of 400 g/mol, such as polyether polyols, polycarbonate polyols, and polyester polyols,
compounds D which possess at least two groups which are reactive toward isocyanate groups and at least one group which is capable of forming anions,
compounds F which carry at least one hydroxyl group F1 and at least one functional group F2 selected from the group consisting of amino and mercapto groups, and hydroxyl groups F21 that are activated so that their reactivity towards isocyanate groups is higher than that of hydroxyl group F1.

The invention further provides a process for preparing the water-dispersible polyurethane resins U, which comprises the steps of
synthesising an isocyanate-functional prepolymer by reacting polyfunctional isocyanates A with oils B, low molar mass polyols C, and compounds D which contain at least two isocyanate-reactive groups and at least one group capable of forming anions, to give a prepolymer which contains free NCO groups, which is then reacted with compounds F under at least partial consumption of the said free NCO groups,
at least partly neutralising the group capable of forming anions in the compound D, to form anionic groups, and dispersing this polymer in water.

The invention further provides paints which comprise these polyurethane resins U as binders, although it is also possible where appropriate to use other binders as well in a mixture with these polyurethane resins U; coatings produced with these paints; and films obtainable by applying paints comprising the polyurethane resins U and crosslinking agents X, which are preferably isocyanate-based curing agents I.

DETAILED DESCRIPTION OF THE PREFERRED EMBODIMENTS

The isocyanates A are at least difunctional and may be selected from the group consisting of aromatic and aliphatic linear, cyclic, and branched isocyanates, especially diisocyanates. Preference is given to diisocyanates, in which case it is possible for up to 5% of their mass to be replaced by isocyanates with a functionality of three or more.

The diisocyanates preferably correspond to the formula $Q(NCO)_2$, in which Q stands for a hydrocarbon radical having from 4 to 40 carbon atoms, in particular from 4 to 20 carbon atoms, and preferably denotes an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms or an araliphatic hydrocarbon radical having from 7 to 15 carbon atoms. Examples of such diisocyanates which can be used with preference are tetramethylene diisocyanate, hexa-methylene diisocyanate, dodecamethylene diisocyanate, 1,4-diisocyanatocyclohexane, 3-isocyanatomethyl-3,5,5-trimethylcyclohexyl isocyanate (also referred to as isophorone diisocyanate, IPDI), 4,4'-diisocyanatodicyclo-hexylmethane, 4,4'-diisocyanato-dicyclo-hexylpropane-(2, 2), 1,4-diisocyanatobenzene, 2,4- or 2,6-diisocyanatotoluene or mixtures of these isomers, 4,4'- or 2,4'-diisocyanatodiphenylmethane, 4,4'-diiso-cyanato-diphenylpropane-(2,2), p-xylylene diisocyanate, and α,α,α',α'-tetramethyl-m- or -p-xylylene diisocyanate, and mixtures of these compounds.

As well as these simple polyisocyanates, suitable polyisocyanates include those which contain heteroatoms in the radical linking the isocyanate groups. Examples thereof are polyisocyanates containing carbodiimide groups, allophanate groups, isocyanurate groups, urethane groups, acylated urea groups or biuret groups. For further suitable polyisocyanates, refer for example to DE-A 29 28 552.

Also suitable are "paint polyisocyanates" based on hexamethylene diisocyanate or on 1-isocyanato-3,3,5-trimethyl-4-isocyanatomethylcyclohexane (IPDI) and/or bis-(isocyanatocyclohexyl)methane, especially those based exclusively on hexamethylene diisocyanate. "Paint polyisocyanates" on the basis of these diisocyanates are those derivatives of these diisocyanates that are known per se and contain biuret, urethane, uretdione and/or isocyanurate groups and that, following their preparation, have been freed where appropriate from excess starting diisocyanate in a known way, preferably by distillation, down to a residual mass fraction of less than 0.5%. The preferred aliphatic polyisocyanates for use in accordance with the invention include poly-isocyanates which meet the above criteria, contain biuret groups, and are based on hexamethylene diisocyanate, such as may be obtained, for example, by the processes of U.S. Pat. Nos. 3,124,605, 3,358,010, 3,903,126, 3,903,127 or 3,976,622, which are composed of mixtures of N,N,N-tris(6-isocyanatohexyl) biuret with minor amounts of its higher homologues, and also the cyclic trimers of hexamethylene diisocyanate which meet the stated criteria and can be obtained in accordance with U.S. Pat. No. 4,324,879, and which are composed essentially of N,N,N-tris(6-isocyanatohexyl) isocyanurate in a mixture with minor amounts of its higher homologues. Particular preference is given to mixtures of polyisocyanates which meet the stated criteria, contain uretdione and/or isocyanurate groups, and are based on hexamethylene diisocyanate, such as are formed by catalytic oligomerisation of hexamethylene diisocyanate using trialkylphosphanes. Particular preference is given to the last-mentioned mixtures with a viscosity at 23° C. of from 50 mPa·s to 20 000 mPa·s and an NCO functionality of between 2.0 and 5.0.

The aromatic polyisocyanates which are likewise suitable in accordance with the invention but are preferably to be used in a mixture with the abovementioned aliphatic polyisocyanates include in particular "paint polyisocyanates" based on 2,4-diisocyanatotoluene or its technical-grade mixtures with 2,6-diisocyanatotoluene or on 4,4-diisocyanatodiphenylmethane and/or its mixtures with its isomers and/or higher homologues. Aromatic paint polyisocyanates of this kind are, for example, the isocyanates which contain urethane groups, such as are obtained by reacting excess amounts of 2,4-diisocyanatotoluene with polyhydric alcohols such as trimethylolpropane and then where appropriate removing the unreacted diisocyanate excess by distillation. Examples of further aromatic paint polyisocyanates are the trimers of the monomeric diisocyanates exemplified, i.e., the corresponding isocyanato-isocyanurates, which following their preparation may have been rid, preferably by distillation, from excess monomeric diisocyanates. In the mixtures of aromatic and (cyclo) aliphatic isocyanates, the amounts of these two components are chosen such as to ensure that the isocyanate groups of the prepolymer are exclusively or at least 90% (cyclo)aliphatically attached (meaning that the carbon atom carrying the isocyanate group is a member of a cycloaliphatic ring or an aliphatic chain).

The polyisocyanate component A may further be composed of any desired mixtures of the polyisocyanates exemplified.

The mass fraction of building blocks derived from the polyisocyanates A in the polyurethane resin is generally from about 10% to 50%, preferably from 20% to 35%, based on the mass of the polyurethane resin U.

The oils B are esters of polyhydric alcohols, preferably of glycerol, with fatty acids, where at least a part of the fatty acids bears at least one hydroxyl group, and which oils have hydroxyl numbers of from 120 mg/g to 230 mg/g, preferably from 120 mg/g to 210 mg/g, and particularly preferred, from 140 mg/g to 190 mg/g.

The hydroxyl number is defined in accordance with DIN 53 240 as the ratio of the mass $m_{KOH}$ of potassium hydroxide which has exactly the same number of hydroxyl groups as a sample under analysis to the mass $m_B$ of that sample (mass of the solid in the sample in the case of solutions or dispersions); its customary unit is "mg/g".

The mass fraction of building blocks derived from component B in the polyurethane resin U is preferably between 15% and 80%, and particularly preferably between 40% and 60%, based on the mass of the polyurethane resin U.

The low molar mass polyols C which are used where appropriate for synthesising the polyurethane resins U have the general effect of stiffening the polymer chain. They generally possess a molar mass of from about 62 g/mol to 400 g/mol, preferably from about 76 g/mol to 200 g/mol, and hydroxyl numbers of from 200 mg/g to 1500 mg/g. They may contain aliphatic, alicyclic or aromatic groups. Their mass fraction is generally from 5% to 20%, preferably from 8% to 17%, based on the mass of the polyurethane U. Suitable, for example, are the low molar mass polyols having up to about 20 carbon atoms per molecule, examples being ethylene glycol, diethylene glycol, 1,2-propanediol, 1,3-propanediol, 1,4-butanediol, 1,2- and 1,3-butylene glycol, neopentylglycol, 1,2- and 1,4-cyclohexanediol, 1,4-cyclohexanedimethanol, 1,6-hexanediol, bisphenol A (2,2-bis-(4-hydroxyphenyl)propane), hydrogenated bisphenol A (2,2-bis(4-hydroxycyclohexyl)-propane) and mixtures thereof, and also, as triols, trimethylolethane and trimethylolpropane. It is preferred to use exclusively or at least predominantly diols, generally in a mass fraction of the polyols of more than 90% of their mass, preferably more than 95%.

Where compounds with a functionality of three or more are used as compounds A, B and/or C, it should be ensured when synthesising the polymer that no gelling occurs. This can be prevented, for example, by using monofunctional compounds together with the trictional or higher polyfunctional compounds, the amount of the monofunctional compounds in that case being chosen preferably such that the average functionality of the component in question does not exceed 2.6, preferably 2.5, and in particular 2.4.

The anionogenic compounds D contain at least one and preferably at least two isocyanate-reactive groups such as hydroxyl, amino, and mercaptan groups and at least one acid group which forms anions upon at least partial neutralisation in aqueous solution or dispersion. Such compounds are described, for example, in U.S. Pat. Nos. 3,412,054 and 3,640,924 and also in the laid-open DE specifications 26 24

442 and 27 44 544, which are hereby incorporated by reference. Particularly suitable for this purpose are polyols, preferably diols, which contain at least one carboxyl group, generally from 1 to 3 carboxyl groups, per molecule. Other groups capable of forming anions suitably include sulfonic acid groups and phosphonic acid groups. Particular examples of compounds D are dihydroxy carboxylic acids, such as α,α-dialkylol-alkanoic acids, especially α,α-dimethylolalkanoic acids such as 2,2-dimethylolacetic acid, 2,2-dimethylolpropionic acid, 2,2-dimethylolbutyric acid, 2,2-dimethylolpentanoic acid, and the isomeric tartaric acids, and also polyhydroxy acids such as gluconic acid. Particularly preferred in this context is 2,2-dimethylolpropionic acid. Examples of amino-containing compounds D are 2,5-diaminovaleric acid (ornithine) and 2,4-diamino-toluene-5-sulfonic acid. It is also possible to employ mixtures of the compounds D mentioned. The mass fraction of building blocks derived from component D in the poly-urethane resin U is generally from 2% to 20%, preferably from 4% to 10%, based on the mass of polyurethane resin U.

The compounds F are monofunctional compounds which are reactive with NCO groups, such as monoamines, especially mono-secondary amines, or monoalcohols. Examples that may be mentioned here include the following: methylamine, ethylamine, n-propylamine, n-butylamine, n-octylamine, laurylamine, stearylamine, isononyloxy-propylamine, dimethylamine, diethylamine, di-n- and di-isopropylamine, di-n-butylamine, N-methylaminopropylamine, diethyl- and dimethylaminopropylamine, morpholine, piperidine, and suitably substituted derivatives thereof, amidoamines formed from diprimary amines and monocarboxylic acids, and monoketimines of diprimary amines, and primary/tertiary amines, such as N,N-dimethylaminopropylamine.

Suitable compounds F preferably also include those containing active hydrogen with a reactivity which differs with respect to NCO groups, especially compounds which contain not only a primary amino group but also secondary amino groups, or which contain not only an OH group but also COOH groups or not only an amino group (primary or secondary) but also OH groups, the latter being particularly preferred. Examples of such compounds include the following: primary/secondary amines, such as 3-amino-1-methylaminopropane, 3-amino-1-ethylaminopropane, 3-amino-1-cyclo-hexylaminopropane, 3-amino-1-methylaminobutane; monohydroxy carboxylic acids, such as hydroxyacetic acid, lactic acid or malic acid, and also alkanolamines such as N-aminoethylethanolamine, ethanolamine, 3-aminopropanol, neopentanolamine, and N-methyl glucamine, and, with particular preference, diethanolamine and N-methyl glucamine. It is of course also possible where appropriate to use compounds F which in addition to the isocyanate-reactive groups contain olefinic double bonds. Following application to a substrate, the polyurethanes thus obtained can be crosslinked by the action of high-energy radiation such as UV rays or electron beams.

It is also possible in this way to introduce additional functional groups into the polymeric end product and so to make this product more reactive toward materials, such as curing agents, if desired. The mass fraction of building blocks derived from component F in the polyurethane resin U is customarily between 2% and 20%, preferably between 3% and 10%, based on the mass of the polyurethane resin.

The polyurethanes U of the present invention are made in a multi-step reaction, wherein preparation of the polyurethane prepolymers in the first step takes place in accordance with the known techniques. The polyfunctional isocyanate A is used in an excess over the hydroxy functional compounds B and D, so giving a product containing free iso-cyanate groups. These isocyanate groups are terminal and/or pendant, preferably terminal. The amount of polyisocyanate A is appropriately such that the ratio of the number of isocyanate groups in the amount of component A used to the total number of the OH groups in the hydroxy functional compounds B and D used is from 1.05 to 1.4, preferably from 1.1 to 1.3.

Preparation of the prepolymer is normally conducted at temperatures of from 60° C. to 140° C., preferably from 80° C. to 120° C., depending on the reactivity of the isocyanate used, generally in the absence of a catalyst, but preferably in the presence of solvents which are inert toward isocyanates. Solvents particularly suitable for this purpose are those which are compatible with water, such as the ethers, ketones, and esters, mentioned later on below, and also N-methylpyrrolidone. The mass fraction of this solvent appropriately does not exceed 30% and is preferably situated within the range from 5% to 20%, based in each case on the sum of the masses of the polyurethane resin U and the solvent. It is appropriate to add the polyisocyanate to the solution of the other components. It is, however, likewise also possible to first add the polyisocyanate A to the oil B and the polyol C and then to react the prepolymer ABC thus produced with component D, which is dissolved in a solvent inert toward isocyanates, preferably N-methylpyrrolidone, N-ethyl pyrrolidone, ethers, or ketones, to give the prepolymer ABCD.

The prepolymer ABCD or its solution is then reacted with compound F, the temperature being appropriately in the range of from 50° C. to 130° C., preferably between 80° C. and 120° C., until the NCO content in the reaction mixture has fallen virtually to zero. Optionally, as discussed supra, it is also possible to conduct a chain extension reaction, which may be made preferably in the aqueous phase, or also in the organic phase.

It is also possible, in a further preferred embodiment, to limit the amount of compounds F so that there is a residual amount of isocyanate groups left, such as preferably in a specific amount of from 50 mmol/kg to 300 mmol/kg, expressed as amount of substance n(NCO) of unreacted isocyanate groups divided by the mass m(ABCDF) of the intermediate polyurethane ABCDF. In this case, at least a part of the remaining unreacted isocyanate groups are consumed by reaction with so-called chain extenders G, such as primary or secondary diamines or dihydrazides, the fraction of the number of amino or hydrazine hydrogen atoms in G to the total number of amino and hydrazine hydrogen groups in compounds F and G being less than or equal to 0.5. In a preferred embodiment, in the first step, the reaction of the prepolymer ABCD with the said compounds F is conducted to such extent that the amount of isocyanate groups left after the reaction of ABCD with F is from 70 mmol/kg to 250 mmol/kg, expressed as amount of substance n(NCO) of unreacted isocyanate groups divided by the mass m(ABCDF) of the intermediate polyurethane ABCDF, the remainder of the isocyanate groups being at least partially consumed by reaction of the intermediate polyurethane ABCDF with a compound G selected from the group consisting of aliphatic primary and secondary amines having at least two amino groups per molecule, and aliphatic hydrazines and hydrazides having at least two hydrazine or hydrazide groups per molecule.

Particularly suitable for neutralising the resultant polyurethane which preferably has acidic carboxyl groups are ammonia, and tertiary amines, such as trialkylamines having from 1 to 12, preferably from 1 to 6, carbon atoms in each alkyl radical. Examples of these are trimethylamine, triethylamine, methyldiethylamine, and tripropylamine. The alkyl radicals may also preferably carry hydroxyl groups, as in the case of the hydroxyamine compounds such as dialkylmonoalkanolamines, alkyldialkanolamines, and trialkanolamines. A preferred example of hydroxyamine compounds is dimethylethanolamine which is used preferably as the neutralising agent.

The neutralising agent is usually used in amounts such that the ratio of the sum of the amount of substance of amine groups and the amount of substance of hydroxyl ions formed in the aqueous solution to the amount of substance of the acid groups of the prepolymer is from about 0.3:1 to 1.3:1, preferably from about 0.5:1 to 1:1.

Neutralisation which generally takes place between room temperature and 110° C. can be carried out in any manner desired: for example, by adding the aqueous neutralising agent to the polyurethane resin U or vice versa. It is, however, also possible first to add the neutralising agent to the polyurethane resin and only then to add the water. In general, a mass fraction of solids in the dispersion of the polyurethane resin U of from 20% to 70% is obtained in this way, preferably from 30% to 50%.

For the preparation of a coating composition, crosslinking agents selected from the group consisting of polyaziridines Z, carbodiimides Y, and non-blocked polyfunctional isocyanates I, (curing at room temperature or slightly elevated temperature) are added to the polyurethane resin U of the invention.

Polyaziridines Z are compounds having two or more aziridine groups (azacyclopropane groups or ethylene imine groups) which optionally carry a methyl substituent on one or more of the ring carbon atoms (2-methyl aziridine or propylene imine groups). They are usually made by addition to polyfunctional (meth)acrylates, such as ethylene glycol di(meth)acrylate, 2-ethyl-2-hydroxymethyl-1,3-propanediol tri(meth)acrylate, trimethylopropane tri(meth)acrylate, and pentaerythritol tetra(meth)acrylate, with the nitrogen atom being bound to the carbon atom in the beta position to the carboxylic acid group. A preferred commercial polyaziridine is the addition product of ethylene imine to pentaerythritol triacrylate. Typically, polyaziridines having a substituent R' at the nitrogen atom add to molecules bearing carboxylic acid groups R—CO—OH under formation of a structure R—CO—O—CH$_2$—CH$_2$—NH—R'. This reaction is used in cross-linking resins bearing pendant carboxyl functional groups.

Carbodiimides Y contain the structure —N=C=N— which can add in a known manner to carboxy functional and, with less reactivity, to other active hydrogen atoms, which reaction is particularly useful in polymers. This reaction is used in cross-linking resins bearing pendant carboxyl functional groups. A particularly useful carbodiimide is dicyclohexyl carbodiimide.

The polyfunctional isocyanates I are those as mentioned under A.

For the formulation of aqueous coating compositions, the customary auxiliaries and additives of paint technology are incorporated into the aqueous dispersion of the polyurethane resin. These auxiliaries and additives include, for example, defoamers, levelling agents, pigments, and pigment dispersing agents.

The resultant coating compositions according to the invention are suitable for virtually all fields of use in which nowadays use is made of solvent borne, solvent free or other aqueous painting and coating systems with an elevated profile of properties, where the substrates to be coated may be selected from the group consisting of metals, mineral building materials such as lime, cement or plaster, fibre cement building materials, concrete, wood and wood materials, paper, cardboard, asphalt, bitumen, plastics of diverse kinds, textiles or leather. They are particularly suitable, however, as coating compositions for wood or wood based materials.

The coatings produced therewith are notable for their toughness and elasticity, and also enhanced chemical stability and good mechanical properties.

EXAMPLES

Example 1

925 g of castor oil with a hydroxyl number of 164 mg/g, 194.5 g of neopentyl glycol, 163.9 g of dimethylol propionic acid, 90 g of methoxypropanol and 274.2 g of dipropylene glycol dimethyl ether were charged in a glass vessel and heated to between 120° C. and 130° C. 540.1 g of isophorone diisocyanate were slowly added and stirred at this temperature until the dimethylol propionic acid was completely dissolved. The mixture was then cooled to 80° C., and further 673.8 g of isophorone diisocyanate were added. The resin solution was stirred until the isocyanate concentration (mass fraction of isocyanate groups in the mass of the reaction mixture) had reached 2.1%. The residual isocyanate groups were then consumed by addition of 145.6 g of diethanolamine, with remarkable exothermy. When no more isocyanate could be detected, 145.6 g of dimethyl ethanolamine were added to neutralise the acid groups. The reaction mixture was then diluted with 3444.5 g of fully deionised water to obtain an opaque dispersion of small particles with a mass fraction of non-volatile components (solids) of 42.3%, as measured by drying a sample of 1 g at 125° C. for 1 hour. The dispersion had a pH of 7.0 (measured in a diluted solution of 10 g of the dispersion in 90 g of in water), an average particle size of 76 nm, and a dynamic viscosity of 244 mPa·s, measured at 23° C. and a shear reate of 25 s$^{-1}$.

Example 2

163.9 g of dimethylol propionic acid were added to a mixture of 1213.5 g of isophorone diisocyanate and 274.1 g of dipropylene glycol dimethyl ether. The mixture was heated to a maximum temperature of 90° C. whereupon the dimethylolpropionic acid was completely dissolved. When the mixture had become clear, it was cooled to 70° C., and a solution of 194.5 g of neopentyl glycol in 925 g of castor oil with a hydroxyl number of 166 mg/g which was free of water was slowly added. The temperature rose to 100° C. during this addition. When this temperature had been kept for 15 minutes, 250.6 g of diethanolamine were added. After the evolution of heat had subsided, the mixture was further stirred until no more isocyanate was detectable. By neutralising with 54.5 g of dimethylethanolamine and subsequent dispersion with 5060.6 g of fully deionised water, a small particle opaque dispersion with a mass fraction of solids of 34.5%, a pH of 7.4, a dynamic viscosity of 5647 mPa·s and an average particle size of 39 nm was obtained.

Example 3

163.9 g of dimethylol propionic acid were added to a mixture of 1213.5 g of isophorone diisocyanate and 274.1 g of dipropylene glycol dimethyl ether. The mixture was heated to a maximum temperature of 90° C. whereupon the dimethylolpropionic acid was completely dissolved. When the mixture had become clear, it was cooled to 70° C., and a solution of 194.5 g of neopentyl glycol and poly(hexane diol cabonate) diol having a hydroxyl number of 113 mg/g) in 647.5 g of castor oil with a hydroxyl number of 166 mg/g which was free of water was slowly added. The temperature rose to 100° C. during this addition. When this temperature had been reached for 15 minutes, 250.6 g of warm diethanolamine were added. After the evolution of heat had subsided, the mixture was further stirred until no more isocyanate was detectable. By neutralising with 54.5 g of dimethylethanolamine and subsequent dispersion in 5039.1 g of fully deionised water, a small particle opaque dispersion with a mass fraction of solids of 35.3%, a pH of 7.3, a dynamic viscosity of 3338 m·Pas and an average particle size of 127 nm was obtained.

Example 4

Coating Test

The polyurethane dispersions of Examples 1 and 3 were formulated as coating compositions according to the information of table 1, and tested against a commercial two pack aqueous polyurethane coating composition.

The test results are listed in table 2.

TABLE 1

Coating Compositions (masses in g, number ratio in %)

|  | Paint 1 | Paint 2 |
|---|---|---|
| PU dispersion of Example 1 | 100 g | |
| PU dispersion of Example 3 | | 100 g |
| Defoamer [1] | 0.5 g | 0.5 g |
| butyl glycol | 4 g | 4 g |
| Thickening agent [2] | 2 g | 2 g |
| Surfactant [3] | 0.3 g | 0.3 g |
| isocyanate crosslinker [4] | 15.7 g | 24.3 g |
| water | 10 g | 21 g |
| ratio of number of NCO to number of OH groups | 150% | 150% |

[1] ® Tego Foamex 805, diluted with water in am mass ratio of 1:1, Degussa AG
[2] ® Rheolate 278, polyether urea polyurethane, 2.5% strength solution in water, Rheox Inc.
[3] ® Byk 346, polydimethyl siloxane, Byk GmbH
[4] ® Rhodocoat WT 2102, isocyanate crosslinker for aqueous systems, dissolved in methoxypropyl acetate, mass fraction of solids 80%, Rhodia Europe S.A.

TABLE 2

Coating Properties

|  | Paint 1 | Paint 2 | Commercial Paint |
|---|---|---|---|
| Pendulum Hardness [1] | 161 s | 137 s | 79 s |
| Spot Test [2], Acetone | 55 s | 78 s | 35 s |
| idem, Ethanol | 92 s | 144 s | 90 s |
| idem, water | >24 h | 24 h | 24 h |
| Spot Test on Maple Veneer [3], Coffee | 5 | 5 to 4 | 3 |
| idem, Red Wine | 5 to 4 | 5 | 4 |
| Wood Wetting [4] | 10 | 15 | 25 |

[1] 150 μm of wet film applied on a glass substrate, measured according to DIN EN ISO 1522, after drying for 10 min at 23° C., 30 min at 80° C., and cooling for 30 min at 23° C.
[2] measured on a dried coating film as under 1, time indicated where it is possible to remove the coating layer with a finger nail
[3] Spot Test according to DIN 68 861 1B, drying for 1 week at 23° C., exposure on coated veneer: 16 h for coffee, 6 h for red wine: 5 is good, and 1 is poor
[4] Wood wetting: rated appearance, from 10 (good) to 50 (poor)

It can be concluded that the protection against mechanical and chemical exposure is on par with, or even better than for conventional aqueous polyurethane coatings, while the wood wetting properties are markedly better in the case of paints 1 and 2.

A similar comparison test has been made with a polyurethane prepared according to EP 1 026 186 A1. It has been found that the mechanical properties of the paints 1 and 2, as well as the wood wetting properties were superior to those of the comparative

The invention claimed is:

1. A two-pack coating composition comprising
crosslinking agents selected from the group consisting of non-blocked polyfunctional isocyanates I, polyaziridines Z, and carbodiimides Y, and
an aqueously dispersed polyurethane U wherein the polyurethane U is obtained by reaction of polyfunctional isocyanates A,
oils B that are esters of polyhydric alcohols B1 and fatty acids B2, wherein at least a mass fraction of 40% of the said fatty acids B2 is comprised of fatty acids B21 which have at least one hydroxyl group and, optionally, at least one olefinic unsaturation, such oils B having a hydroxyl number of from 120 mg/g to 230 mg/g, with
low molar mass polyols C having a number average molar mass $M_n$ of up to 400 g/mol, and
compounds D which possess at least two groups which are reactive toward isocyanate groups and at least one group which is capable of forming anions,
to form a prepolymer ABCD which is then reacted with
compounds F which carry at least one hydroxyl group F1 and at least one functional group F2 selected from the group consisting of amino groups, mercapto groups, and hydroxyl groups F21 that are activated so that their reactivity towards isocyanate groups is higher than that of hydroxyl group F1,
until the NCO content in the reaction mixture has fallen to zero,
wherein the ratio of the number of isocyanate groups in A to the total number of hydroxyl groups in the hydroxy-functional compounds B and D is from 1.05 to 1.4.

2. The two-pack coating composition of claim 1 wherein the hydroxyl group containing unsaturated fatty acids B21 are incorporated into the polyurethane U by reaction of their hydroxyl group with an isocyanate group of a polyfunctional isocyanate A which is used in the synthesis of the polyurethane U.

3. The two-pack coating composition of claim 1 wherein the fatty acid B21 is ricinoleic acid.

4. The two-pack coating composition of claim 1 where the crosslinking agent is a non-blocked polyfunctional isocyanate I.

5. A method of use of the coating compositions of claim 1 comprising mixing
crosslinking agents selected from the group consisting of non-blocked polyfunctional isocyanates I, polyaziridines Z, and carbodiimides Y, and
the aqueously dispersed polyurethane U as claimed in claim 1, adding to the mixture at least one of water and additives selected from the group consisting of defoamers, levelling agents, wetting agents, surfactants, thickening agents, and coalescents, and applying the mixture to a substrate, characterised in that unsaturated hydroxyl group containing fatty acids B21 are used to synthesise the polyurethane U.

6. The method of claim 5 where the substrate is wood or a wood-based material.

* * * * *